April 13, 1943. W. A. CHARBONNEAUX 2,316,561
AUTOMATIC FREQUENCY REGULATOR
Filed Sept. 6, 1941 4 Sheets-Sheet 1
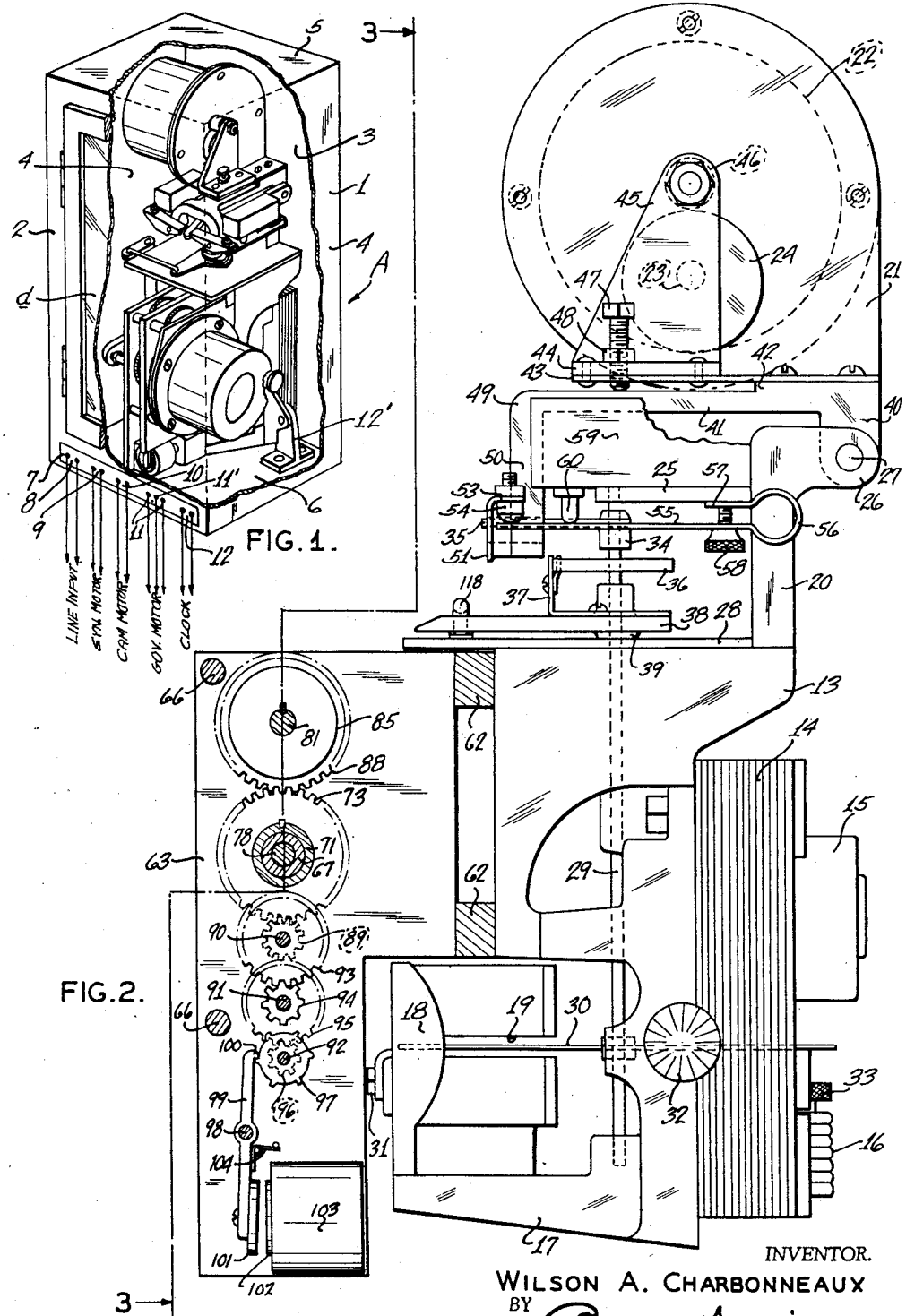
INVENTOR.
WILSON A. CHARBONNEAUX
BY
ATTORNEY April 13, 1943. W. A. CHARBONNEAUX 2,316,561
AUTOMATIC FREQUENCY REGULATOR
Filed Sept. 6, 1941 4 Sheets-Sheet 2

INVENTOR.
WILSON A. CHARBONNEAUX
BY
ATTORNEY

April 13, 1943.   W. A. CHARBONNEAUX   2,316,561
AUTOMATIC FREQUENCY REGULATOR
Filed Sept. 6, 1941   4 Sheets-Sheet 3

INVENTOR.
WILSON A. CHARBONNEAUX
BY
ATTORNEY

April 13, 1943.  W. A. CHARBONNEAUX  2,316,561
AUTOMATIC FREQUENCY REGULATOR
Filed Sept. 6, 1941  4 Sheets—Sheet 4

INVENTOR.
WILSON A. CHARBONNEAUX
BY
ATTORNEY

Patented Apr. 13, 1943

2,316,561

UNITED STATES PATENT OFFICE 2,316,561

AUTOMATIC FREQUENCY REGULATOR

Wilson A. Charbonneaux, Burlington, Iowa

Application September 6, 1941, Serial No. 409,804

14 Claims. (Cl. 171—119)

This invention relates generally to automatic frequency regulators and, more particularly, to certain new and useful improvements in automatic frequency regulators especially adapted for use with alternating current generators.

My invention has for its primary objects the provision of an automatic frequency regulator of the type stated which is compact and rugged in construction, which may be simply and quickly installed as a unit, which is highly sensitive to frequency variations of the alternator over which it establishes control, which is uniquely constructed for sensing or detecting the magnitude of frequency departure of an alternator to which it is connected and integrating such frequency departure to effect chronometric over-compensation or "time make-up," as it may be called, so that the controlled generator will maintain an average frequency which conforms, within very narrow limits, to a selected frequency, which responds very quickly to any variation in generator frequency and operates to maintain a relatively precise degree of uniformity in the frequency of the generator output, which has no tendency to produce hunting or cycling of the control imposed upon the generator, and which is highly efficient in the performance of its stated functions.

And with the above and other objects in view, my invention resides in the novel features of form, construction, arrangement, and combination of parts presently described and pointed out in the claims.

In the accompanying drawings (four sheets)—

Figure 1 is a reduced perspective view of an automatic frequency regulator constructed in accordance with and embodying my invention, the housing being partially broken away for disclosing the various operating parts of the apparatus;

Figure 2 illustrates the regulator partly in side elevation and partly in section along the line 2—2, Figure 3, the housing being omitted;

Figure 3:
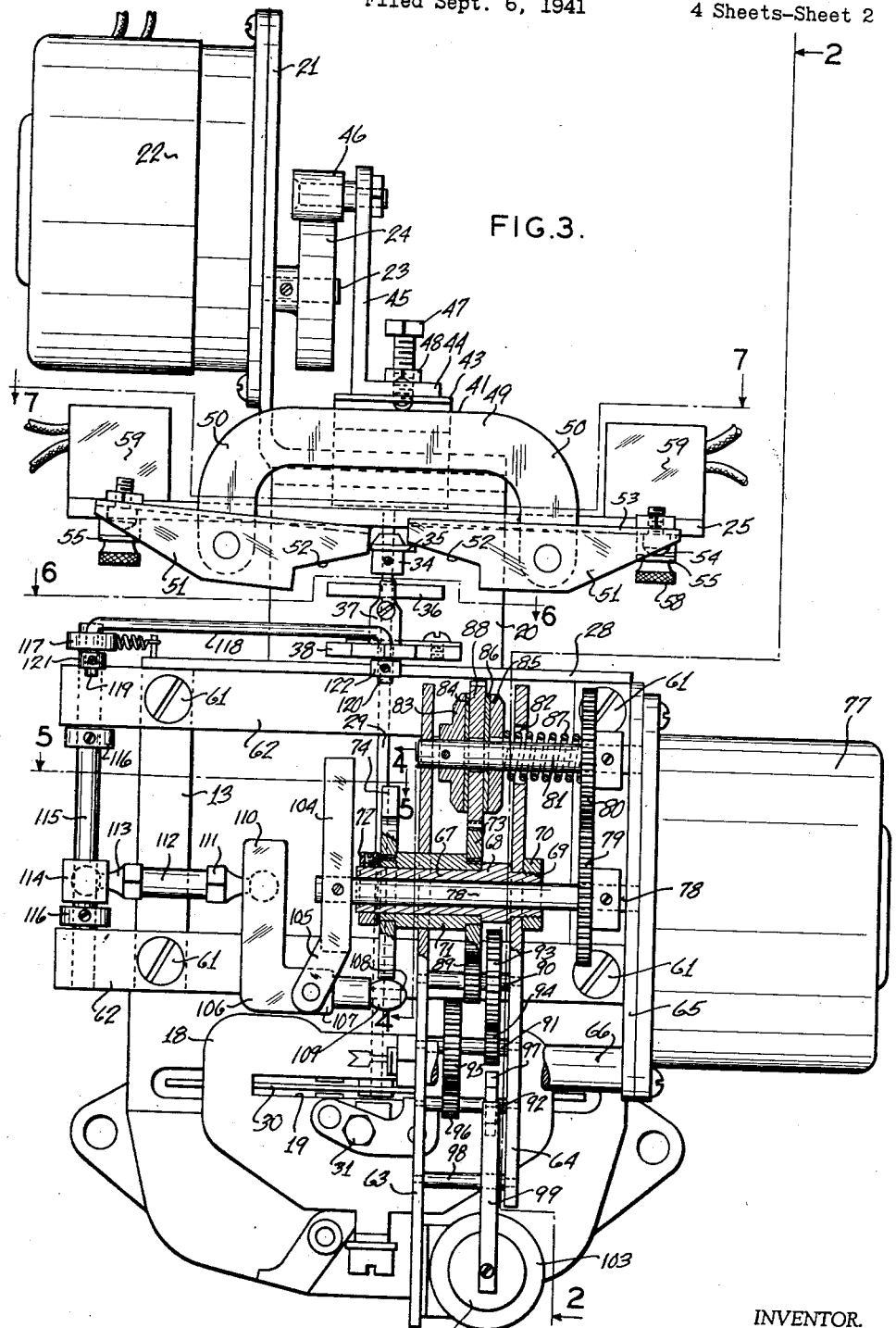
Figure 3 illustrates the regulator partly in front elevation and partly in section along the line 3—3, Figure 2, the housing being omitted.
Figure 8:
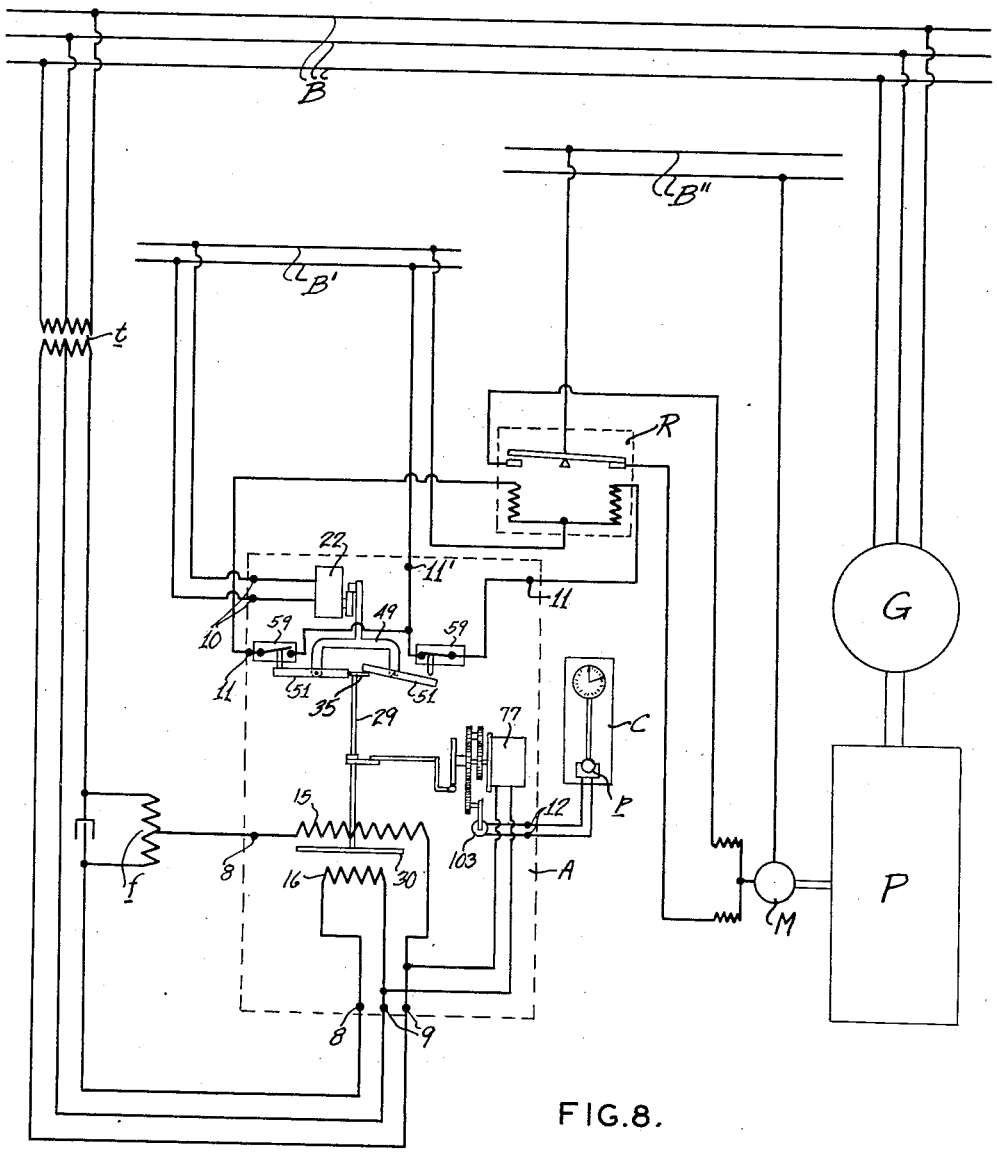

Figures 4, 5, 6, and 7 are fragmentary transverse sectional views of the regulator taken approximately along the lines 4—4, 5—5, 6—6, and 7—7, respectively, Figure 3, and depicting in enlarged detail various specific elements of the apparatus; and Figure 8 is a wiring diagram schematically illustrating the manner in which the regulator and its several component elements are connected for effecting control of an alternator.

Referring now in more detail and by reference characters to the drawings, which illustrate a preferred embodiment of my invention, the automatic frequency regulator, generally designated A, comprises a housing or cabinet 1 constructed preferably of sheet metal and of rectilinear form and including front and rear walls 2, 3, respectively, opposite side walls 4, and top and bottom walls 5, 6, respectively, the front wall 2 having an opening for accommodating a hinged, glass-paneled door d. Mounted preferably, though not necessarily, upon the front wall 2 of the housing 1 below the door d, is a horizontally disposed terminal-block 7 constructed of any suitable dielectric material and provided with three pairs of terminal posts 8, 9, and 10 and one set of three terminal posts, the latter including two end-posts 11 and an intermediate post 11'.

Mounted within the housing or cabinet 1 and supported upon the bottom wall 6 by means of conventional L-shaped brackets 12', is a vertically disposed frame 13 of more or less rectilinear shape, but having a somewhat irregular contour for conveniently supporting the several moving parts of the apparatus in proper relative position for mechanically efficient co-action with each other while, at the same time, achieving compactness of design.

Mounted at the lower end and upon the rear face of the frame 13, is a lamination-stack 14 provided with a potential coil 15. Mounted also within the lamination stack 14 in downwardly spaced relation to the potential coil 15, is a current coil 16. At its lower end, the frame 13 is preferably integrally formed with a forwardly extending bracket 17, and bolted or otherwise secured upon, and upstanding from the forward end of, the bracket 17, is a conventional magnet-assembly 18 having a relatively narrow air-gap 19.

Formed preferably integrally with, and projecting upwardly from the upper face of, the frame 13, is an auxiliary bracket 20 provided along its one side face with a flat upstanding face-plate 21 for receiving and supporting a suitable electric motor 22 having a drive-shaft 23 extending horizontally through the face-plate 21 and provided on its extended end with an eccentric wheel or cam 24.

Along its forwardly presented face, the bracket 20 is provided with a forwardly projecting horizontally disposed head-plate 25, and at its upper end in laterally spaced relation to the face-plate 21, the bracket 20 is provided with a pair of suitably spaced rearwardly projecting apertured ears 26 for supporting a horizontally disposed pivot-pin 27.

Also fixed upon and extending horizontally across the upper face of the frame 13 in downwardly spaced relation to the head-plate 25, is a top-plate 28.

Journaled at its ends in, and extending vertically between, bearings suitably formed in the head-plate 25 and the bracket 17 and extending freely through the top-plate 28, is a spindle 29 provided adjacent its lower end with a torque-disk 30 disposed in a horizontal plane and projecting peripherally through the air-gap 19 of the magnet-assembly 18 and between the potential coil 15 and current coil 16 in the formation of an induction motor of the watthour meter type, which is provided with the usual full-load adjustment screw 31, light-load adjustment screw 32, and current coil adjustment member 33.

Adjacent its upper end and in the space between the head-plate 25 and the top-plate 28, the spindle 29 is provided with a collar 34 having a substantially rigid forwardly projecting radial arm 35. Beneath the collar 34, the spindle 29 is provided with a spirally wound hair-spring 36 secured at its outer or free end to the upper extremity of an L-shaped bracket 37 mounted upon the upper face of a compensator arm 38, in turn, rockably mounted upon the spindle 29 and supported in upwardly spaced relation to the top-plate 28 by means of a depending shoulder 39.

Swingably mounted upon the pivot-pin 27 by means of a depending offset lug or ear 40, is a rocking arm 41 provided on its upper face with an upstanding shoulder 42. Bolted or otherwise suitably secured upon the upper face of the shoulder 42 and extending horizontally forwardly therefrom in spaced relation over the upper face of the arm 41, is a resilient leaf member 43, riveted upon the upper face of which is an L-shaped bracket 44 having a somewhat triangularly shaped vertical leg 45 provided at its upper end with a cam-following roller 46. Threaded in the bracket 44 and extending through the leaf-member 43 for endwise impinging upon the upper face of the bracket arm 41, is an adjustment screw 47 conventionally provided with a lock-nut 48.

Formed preferably integrally with, and extending laterally outwardly and downwardly from the forward end of, the arm 41, is a yoke 49 preferably of inverted U-shape and accordingly having a pair of spaced parallel depending legs 50 each provided at its lower extremity with a transversely extending rockable contact-lever 51. At their inner or adjacent ends, the contact-levers 51 terminate approximately midway between the legs 50 and are spaced by a distance slightly greater than the width of the adjustment arm 35, the levers 51 at such opposed ends being provided with downwardly presented obliquely diverging abutment-faces 52.

At their opposite or outer ends, the contact-levers 51 are provided along their upper margins with inwardly turned flanges 53, and bolted or otherwise suitably secured to, and depending from, the flanges 53, are ball-ended abutment plugs 54 positioned for endwise abutting engagement with the free ends of horizontally disposed leaf-spring members 55 arcuately bent at their other end in the formation of a loop 56 secured, as at 57, upon the under face of the head-plate 25 and provided with a tension-adjusting screw 58.

Bolted or otherwise suitably secured upon the upper face of the head-plate 25 adjacent the opposite ends thereof, are simple make-and-break switches 59 preferably having conventional spring-pressed plungers 60 extending downwardly therefrom for endwise abutting engagement with the leaf-springs 55, as best seen in Figure 3.

Secured upon the front face of the frame 13 by means of fillister-headed screws 61, are spaced horizontally disposed frame-bars 62, and welded or otherwise fixed along their rear margin to the forwardly presented faces of, and projecting forwardly in laterally spaced parallel relation from, the bars 62, are three thin steel plates 63, 64, 65, rigidly secured to each other adjacent their forward margins by spacer bolts 66.

Extending horizontally through the plate 64, is a tubular bearing or sleeve 67 provided adjacent one end with a diametrally enlarged annular shoulder 68 and externally threaded, as at 69, for receiving a lock-nut 70 adapted to draw the shoulder 68 tightly against the plate 64 for rigidly securing the bearing-member 67 in place.

At its other end, the sleeve 67 is provided with a rotatable quill 71 abuttingly engaged at its one end against the shoulder 68 and extending with the sleeve 67, through the plate 63, the quill 71 being journaled in the plate 63 and held against longitudinal translation along the sleeve 67 by a set-collar 72, as best seen in Figure 3.

Figure 4:
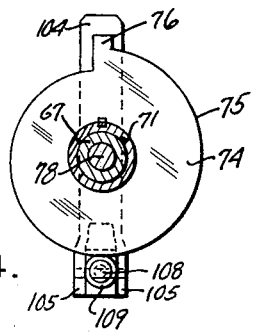
Figure 5:
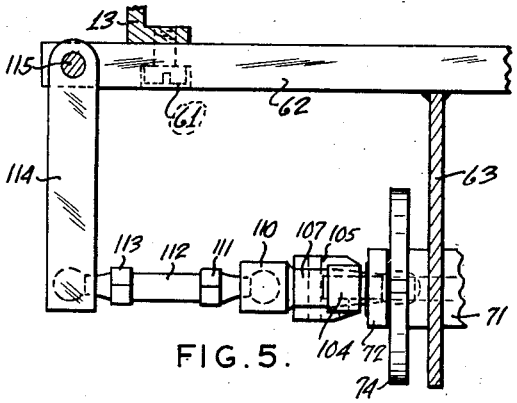

Keyed upon the quill 71 between the plates 63, 64, is a gear 73, and similarly keyed upon the quill 71 adjacent the collar 72, is a cam-disk 74 having a spiral-shaped peripheral surface or track 75 extending around the entire circumference thereof and having its terminal ends connected by a narrow radially projecting stop lug 76, all as best seen in Figure 4.

Bolted or otherwise suitably secured upon the outwardly presented face of the plate 65, is a synchronous electric motor 77 having a drive-shaft 78 projecting freely through the plate 65 and journaled within the sleeve 67. Pinned upon the shaft 78 for rotary movement between the plates 64, 65, is a drive gear 79 having meshing engagement with an intermediate gear 80, in turn, pinned upon a horizontally disposed jack-shaft 81 spaced upwardly from the motor shaft 78 and journaled at its ends in the plates 63, 65, the shaft 81 extending freely through a relatively large aperture, as at 82, in the intermediate plate 64.

Pinned upon the jack-shaft 81 intermediate the plates 63, 64, is a clutch-disk 83 suitably faced with a friction disk 84, and shiftably keyed to the jack-shaft 81 for rotation therewith, is an auxiliary clutch disk 85 also faced with a friction disk 86 and normally urged toward the disk 85 by means of a compression spring 87 coiled on the jack-shaft 81 and disposed freely through the aperture 82 for impingement at its opposite ends against the outer face of the clutch disk 85 and the intermediate gear 80. Frictionally held between the clutch disks 83, 85, and loosely mounted for free rotation upon the jack-shaft 81, is a gear 88 having meshing engagement with the quill-gear 73.

The gear 73 also meshes with a pinion 89, which is part of a clock-work gear train including spindles 90, 91, 92, journaled between the plates 63, 64, and pinions 93, 94, 95, and 96 of suitable selected ratios for transmitting the rotary movement of the gear 73 to the spindle 92. Keyed upon the spindle 92, is a toothed or ratchet wheel 97, and swingably mounted upon an auxiliary spindle 98 suitably supported upon the plates 63, 64, is a pawl 99 provided at its upper end with a detent 100 for engagement with the teeth of the ratchet wheel 97. As best seen in Figure 2, the pawl 99 is elongated to extend downwardly beyond the spindle 98 and at its lower end is provided with a disk-shaped magnetic pole-piece 101 positioned in close proximity to the pole-face 102 of an electro-magnet or solenoid 103 suitably secured upon the lower end of the plate 63, the pawl 99 being biased outwardly by means of a hair-spring or the like 104, so that the pole-piece 101 is normally urged outwardly away from the pole face 102 of the solenoid 103.

The motor shaft 78 is likewise elongated to project outwardly beyond the tubular bearing 67, and pinned upon the projecting end thereof, is a diametrally extending cross-arm 104 provided at one end with an obliquely offset pair of spaced parallel ears 105. 106 designates an L-shaped rock-arm having a horizontal leg 107 swingably secured between the ears 105 and provided with an axially extending round-headed pintle 108 for rotatably supporting a crowned roller or cam follower 109 adapted for engagement with the peripheral track 75 of the cam 74. The other or transverse leg 110 of lever 106 extends preferably, though not necessarily, at 90° to the leg 107 and has its longitudinal axis disposed in a plane which is diametral with respect to the motor shaft 78 and cam 74.

Mounted for universal movement in, and projecting outwardly from, the lever-arm 110, is a ball-ended fitting 111 having its center of rotation precisely aligned with the longitudinal axis of the motor shaft 78, and threaded at one end into the fitting 111, is a link 112 provided at its other end with a second ball-ended fitting 113, in turn, mounted for universal rotation in the outer end of a rearwardly extending arm 114 keyed at its rear end upon a vertically disposed rock-shaft 115 journaled at its ends in, and extending between, the frame bars 62 and conventionally held against vertical translation by means of suitable set collars 116.

Figure 6:
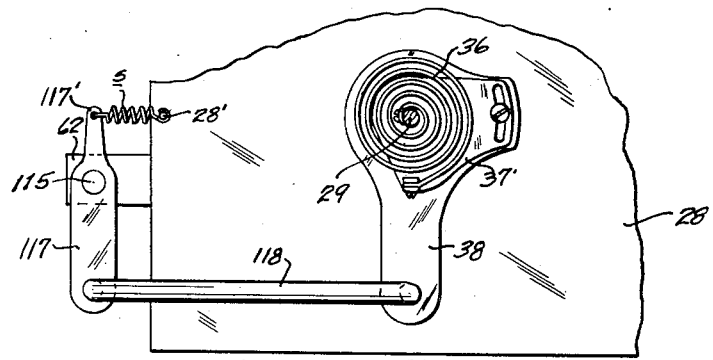
Figure 7:
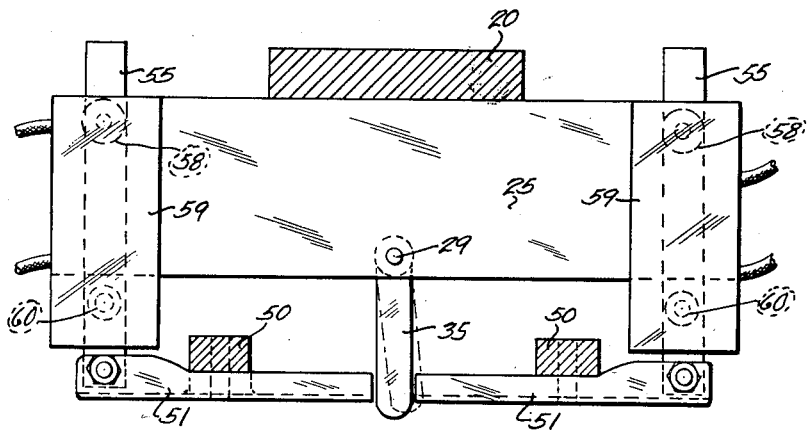

At its upper end, the rock-shaft 115 projects through a frame bar 62 and is provided with a horizontal auxiliary rock-arm 117 having a rearwardly extending projection 117' apertured at its end for receiving one end of a tension spring s, which is secured at its other end to an upstanding pin 28' fixed in the upper face of the top-plate 28 for biasing the cam-following roller 107 against the cam-track 75 and taking up all accumulated wear and lost motion. 118 designates a link which extends lengthwise between, and has downwardly bent end-portions or legs 119, 120, pivotally projecting through, the arms 117 and 38, respectively, the link 118 being secured in place by small set collars 121, 122, all as best seen in Figures 3 and 6.

The potential coil 15 at one end is connected electrically to one of the terminal posts 8 and, similarly, the current coil 16 at one end is connected electrically to the other terminal post 8. The potential coil 15 and current coil 16 at their other end are, respectively, connected electrically in common with the two leads from the synchronous motor 77 to the two terminal posts 9, and the cam driving motor 22 is likewise connected electrically across the terminal posts 10. Each of the switches 59 at one terminal is connected electrically by a common lead to the intermediate terminal post 11' and the other two terminals of the switches 59 are separately connected electrically to the two terminal posts 11. The solenoid 103 is connected electrically to the terminal posts 12.

By reference to the wiring diagram, Figure 8, it will be seen that the frequency regulator A is preferably connected through a conventional step-down transformer $t$ to the output conductors or bus bars B of an alternating current generator G driven by a prime mover P having a governor control or speed-regulating motor M. The terminal posts 8 are connected electrically to the secondary of the transformer $t$ and to a resonant filter circuit $f$. The terminal posts 10 and the terminal post 11' are connected electrically to an auxiliary 120 v. A. C. line or bus B'. The terminal posts 11 are connected electrically to a reversing contactor R, in turn, connected electrically across the bus B' and to one side of a governor motor supply bus B" and to the reversing field of the governor supply motor M, in turn, connected electrically to the other side of the governor motor supply bus B". Finally, the terminal posts 12 are connected electrically to a conventional pendulum-actuated relay $p$ which forms a part of the master clock C.

In use and operation, the resonant filter circuit $f$ is so constructed with condensers and coils of appropriate relative values as to transmit a positive or negative impulse through the potential coil 15 and current coil 16 which is directly proportional to the difference between the frequency of the generator output current and some selected or established frequency. For example, if the resonant filter $f$ is set up for an assigned frequency of 60 cycles, the disk 30 and its associated spindle 29 will remain stationary with the indicator arm 38 held in its central or so-called neutral position. When the frequency of the line current departs from the established frequency, the resonant filter circuit $f$ will transmit a small electrical impulse which is directly proportional to the deviation and is positive or negative, depending upon whether or not the frequency of the line current is above or below the established frequency, thereby causing the disk 30 and its associated spindle 29 to rotate to a degree directly proportional to the magnitude of the frequency deviation and either in a clockwise or counter-clockwise direction, depending upon the positive or negative character of such frequency deviation.

Meanwhile the cam driving motor 22 is in constant operation, and the attendant rotation of the cam 24 continuously rocks the arm 41 and its associated yoke 49, causing the switch arms 51 to move up and down past the radial arm 35. As long as the spindle 29 is stationary and the arm 35 is in neutral position, as shown in full lines in Figure 7, the arm 35 will be aligned with the gap or space between the opposed ends of the switch arms 51 and the latter will pass freely by the arm 35 during the course of their up and down movement. When, however, the disk 30 and the associated spindle 29 are rotated under the influence of current transmitted through the resonant filter $f$, the arm 35 will swing into the path of one or the other of the switch arms 51 for engagement with the oblique abutment face 52 thereof, causing the respective arm 51 to swing upwardly to bring the abutment pin 54 into engagement with the free end of the leaf-spring 55 for actuating the particular switch plunger 60 to complete the circuit through the reversing contactor R to the governor motor M of the prime mover P for speeding up or slowing down the prime mover P in direct response to the magnitude and character of frequency deviation in the line current generated by the alternator G. It will, of course, be evident that this control impulse transmitted to the motor M will be of intermittent character by reason of the constant reciprocation of the yoke 49 and the supported switch arms 51.

As has been above pointed out, however, the magnitude of frequency deviation will produce a corresponding amplitude of swing in the arm 35. For example, where the deviation is relatively great, the arm 35 will be swung through a relatively great arc and will engage an arm 51 at a lower point along the oblique abutment face 52 thereof, so that such arm 51 will remain depressed and the associated switch 59 will remain closed for a correspondingly longer portion of the up and down cycle of the yoke 49. It will thus be evident that the frequency-corrective impulse transmitted to the motor M will vary in magnitude with variations in the magnitude of the frequency deviation even though it is intermittent and, therefore, achieves an anti-hunting effect.

Meanwhile the synchronous motor 77 is rotating and through the shaft 78 is continuously driving the gear 79 and the cam follower bracket 104. By reason of the universal connection between the fitting 111 and the arm 110, such rotary movement of the bracket 104 is not transmitted to the link 112. On the other hand, the rotary movement of gear 79 is transmitted through the gear 80 and the clutch members 83, 85, to the gear 88, which, in turn, meshes with the quill gear 73 and produces rotation of the quill 71 and its associated cam 74.

If the alternator G is to be controlled or regulated to maintain an assigned frequency of sixty cycles, the gear 79 may preferably have one hundred four teeth; the gear 80 accordingly has ten teeth, and the gear 88 likewise has ten teeth meshing with the quill gear 73, which has one hundred teeth. Normally the cam 74 is set in relation to the arm 104, so that the cam follower 109 will engage the cam surface 75 at the midpoint of its peripheral length or so-called neutral position, as shown in Figure 4. Consequently the quill 71 will rotate slightly faster than the shaft 78 and the cam 74 will rotate angularly with relation to the arm 104, shifting the cam follower 109 and imposing bias upon the hair-spring 36 in such a direction as will cause the generator G to gain.

The quill gear 73, however, is also in meshing engagement with the pinion 89 of the clockwork train and consequently produces rotation of the ratchet wheel 97. The ratio of the gears 89, 93, 94, 95, and 96 is such that the ratchet wheel 97 will operate at 5.2 R. P. M. The ratchet wheel 97 is, further, provided with six equally spaced teeth, so that 31.2 teeth will pass any given point adjacent the periphery of the ratchet wheel 97 in one minute. Thus it will be seen that a tooth of the ratchet wheel 97 will pass such given point once every 1.9 seconds. The clock pendulum meanwhile swings or oscillates at the rate of thirty beats or oscillations per minute, thus breaking the solenoid circuit thirty times per minute and lifting the pawl arm 99 periodically at intervals of two seconds. Consequently, if the frequency of the current output of the alternator G is exactly correct, the pawl 99 will hold the ratchet wheel 97 for a period of .1 second during each two second interval.

When the ratchet wheel 97 is held stationary, the rotary movement of the gears 89, 93, 94, 95, and 96 will be suspended and the quill 71 and its associated quill gear 73 will also be held against rotation, causing the gear 88 to slip between the clutch friction discs 84, 86. The retardation of the quill 71 will obviously produce a relative rotary movement between the cam 74 and the bracket arm 104 opposite to that normally produced by the relative difference in speed between the quill 71 and shaft 78, so that the cam follower 109 will slide back over the cam surface 75, imposing an opposite or control-compensating bias on the hair-spring 36, causing the generator G to decelerate or lose by an amount equal to the amount previously gained, so that the average effect during the increment of time in zero. This time make-up or chronometric over-compensation will be precisely and accurately effective as long as the loss in frequency does not exceed 4% of the assigned frequency. Obviously, if the deviation does exceed such 4% limit, a serious time-error has been committed which the regulator itself cannot make up and is of such character as may require shut-down and repair. The gear ratios and other values in the above example may, of course, be varied to achieve a greater or lesser percentage sensitivity in the apparatus.

It will, of course, be evident that the automatic regulator of my present invention will thus operate to maintain a very precise anti-hunting frequency control and, at the same time, will synchronize the frequency of the output current of the alternator with a master clock and cause the control to operate upon the governor motor to make up or compensate for any lost frequency. This latter unique feature is particularly important in view of the widespread use of sixty cycle alternating current for operating timing devices, both of the household as well as the industrial type. Especially with reference to the use of alternating current as a motive power for timing devices, it is not only essential that the frequency be maintained constant and quickly corrected to eliminate any deviation from the established frequency, but also it is exceedingly important that any acceleration or deceleration of the timing devices powered by such alternating current be compensated for. For example, if the movement of an electric clock is accelerated as a result of an increase in the frequency of the current by which it is driven, the clock will tend to run fast. Even though the frequency of the motive current is corrected and brought back to normal, the increment of time which has been gained by the clock will not be corrected. The clock will still be "fast" by whatever increment of time has been gained during the interval in which the frequency of the line current was excessive. My present control apparatus uniquely senses or determines the amount of frequency deviation, integrating the same in terms of time and modifying the control effect of the regulator in terms of this integrated characteristic, so that the generator thus controlled will not only be restored to normal frequency, but will actually be caused to deviate from the normal frequency in the opposite direction of its initial deviation for a sufficient period of time, so that the amount of lost frequency will be made up.

It will be evident that my automatic frequency regulator is relatively simple, rugged, and durable in construction and is extremely accurate and precise in operation, uniquely providing a type of time make-up or chronometric compensating control. Although the regulator may preferably be used for establishing frequency regulating control over an alternator, it will, of course, be understood that this automatic regulating device in its entirety or component parts thereof may be employed for various regulatory and control purposes, and it should further be understood that changes and modifications in the form, construction, arrangement, and combination of the several parts of the mechanism may be made and substituted for those herein shown and described without departing from the nature and principle of my invention.

Having thus described my invention, what I claim and desire to secure by Letters Patent is:

1. A frequency regulator for an alternator having speed-governing means comprising first means mechanically actuable responsive to current proportional to the deviation of the frequency of the alternator output from an assigned frequency for producing frequency-corrective movement of the speed-governing means, accumulating cam means for intergrating the difference between the frequency of the alternator output and the assigned frequency with respect to time, and means actuable by the integrating means for imposing a time-compensating bias upon the mechanically actuable means and thereby modifying the frequency-corrective movement of the speed-governing means.

2. In a frequency regulator for an alternator having a speed-governor, a resonant filter circuit for transmitting a current having a voltage proportional to the frequency departure of the alternator, a motor of the watt-hour meter type driven by the current transmitted by the filter circuit, an arm actuated by the motor for effecting frequency-corrective movement of the speed-governor, spring means for normally holding the arm in a neutral position, and means for integrating the frequency deviation with respect to time and accordingly modifying the effect of the spring means.

3. In a frequency regulator for an alternator having a speed-governor, a resonant filter circuit for transmitting a current having a voltage proportional to the frequency departure of the alternator, a motor of the watt-hour meter type driven by the current transmitted by the filter circuit, a swingable arm mechanically actuated by the motor, means connected to the speed-governor for producing frequency-corrective movement thereof responsive to oscillation of the arm, a synchronous motor driven from the alternator output, a ratchet connected through friction driving means to the synchronous motor and through connecting means to the arm, and means controlled by a clock for arresting movement of the ratchet for a predetermined interval when the frequency of the alternator output is normal and increasing or decreasing such interval of arrested movement in proportion to the integral of the frequency deviation with respect to time.

4. In an alternator frequency regulating mechanism having a movable control arm, a synchronous motor driven from the alternator output, a primary driven member connected directly to the motor, a secondary driven member indirectly connected to the motor through slip-permitting means at a rate substantially faster than the primary member to produce angular departure between the movement of the primary and secondary members, time-controlled means for periodically retarding the secondary member to compensate for such departure so that over a given interval the average departure will be zero, and means actuable responsive to said departure for modifying the movement of the control arm.

5. In an alternator frequency regulating mechanism having alternator speed-controlling means, a synchronous motor driven from the alternator output, a primary driven member connected directly to the motor, a secondary driven member indirectly connected to the motor through slip-permitting means at a rate substantially faster than the primary member to produce angular departure between the movement of the primary and secondary members, time-controlled means for periodically retarding the secondary member to compensate for such departure so that over a given interval the average departure will be zero, and means actuable responsive to said departure for producing a corresponding speed-modifying effect upon the speed-controlling means.

6. In an alternator frequency regulating mechanism having a movable control arm, a spring for biasing said control arm, a synchronous motor driven from the alternator output, a primary driven member connected directly to the motor, a secondary driven member connected indirectly to the motor through slip-permitting means, said secondary member being normally driven faster than the primary member, means for producing a mechanical effect directly proportional to the difference in speed between the primary and secondary members, means for intermittently retarding the secondary member to render the increment of speed gain between the secondary and primary members periodic and non-cumulative, and means for transmitting said mechanical effect to the spring to modify the biasing effect thereof.

7. In an alternator frequency regulating mechanism having a spring-biased control arm, a synchronous motor driven from the alternator output, said motor having a drive shaft provided with a diametral cross frame, a quill rotatably mounted on the shaft and provided with a cam, a driving gear also mounted on the shaft, a driven gear mounted on the quill, friction-clutch means drivingly connecting said gears, a cam-follower rockably carried by the cross frame and bearing on the cam for movement responsive to relative angular movement between the cam and frame, clock-controlled means for modifying the movement of the quill, and means connecting the cam-follower and the control arm biasing spring for modifying the biasing effect of the spring responsive to relative angular movement between the cam and cross frame.

8. In an alternator frequency regulating mechanism having a spring-biased control arm, a synchronous motor driven from the alternator output, said motor having a drive shaft provided with a diametral cross frame, a quill rotatably mounted on the shaft and provided with a cam, a driving gear also mounted on the shaft, a driven gear mounted on the quill, friction-clutch means drivingly connecting said gears, said driving gear and driven gear having a ratio to each other such that the quill and its associated cam are rotated more rapidly than the cross frame to produce a relative angular movement between the cam and cross frame, a cam-follower rockably carried by the cross frame and bearing on the cam for movement responsive to relative angular movement between the cam and frame, clock-controlled means for retarding the quill to compensate for said relative angular movement in such a manner that the average angular movement over a given interval is zero, and means connecting the cam-follower and the control arm biasing spring for modifying the biasing effect of the spring responsive to relative angular movement between the cam and cross frame.

9. In a frequency regulator for an alternator having a speed-governor, a resonant filter circuit for transmitting a current having a voltage proportional to the frequency departure of the alternator, a motor of the watt-hour meter type driven by the current transmitted to the filter circuit, an arm normally disposed in a neutral position actuated by said motor for effecting frequency-corrective movement of the speed-governor, and means for integrating the frequency deviation with respect to time and accordingly modifying the effect of the movement of the arm.

10. In a frequency regulator for an alternator having a speed-governor, a resonant filter circuit for transmitting a current having a voltage proportional to the frequency departure of the alternator, a motor of the watt-hour meter type driven by the current transmitted by the filter circuit, an arm actuated by the motor for effecting frequency-corrective movement of the speed-governor, means for normally holding the arm in a neutral position, and means for integrating the frequency deviation with respect to time and accordingly modifying the effect of the said previously mentioned means.

11. In a frequency regulator for an alternator having a speed-governor, a resonant filter circuit for transmitting a current having a voltage proportional to the frequency departure of the alternator, a motor of the watt-hour meter type driven by the current transmitted by the filter circuit, an arm for effecting frequency-corrective movement of the speed-governor, means for normally holding the arm in a neutral position, and accumulating cam means integrating the frequency deviation with respect to time and accordingly modifying the effect of the means normally holding the arm in neutral position.

12. In a frequency regulator for an alternator, a driving motor, a resonant filter circuit for transmitting a current having a voltage proportional to the frequency departure of the alternator, a motor of the watt-hour meter type driven by the current transmitted by the filter circuit, an arm actuated by said motor, control switches for the alternator driving motor, means for normally holding the arm in a neutral position, and means cooperating with said switch means accomplishing intermittent control impulses to the driving motor of the alternator.

13. In a frequency regulator for an alternator, a driving motor, a resonant filter circuit for transmitting a current having a voltage proportional to the frequency departure of the alternator, a motor of the watt-hour meter type driven by the current transmitted by the filter circuit, an arm actuated by said motor, control switches for the alternator driving motor, means for normally holding the arm in a neutral position, means cooperating with said switch means accomplishing intermittent control impulses to the driving motor of the alternator, and means for varying the duration of the current supply impulses.

14. In a frequency regulator for an alternator, a driving motor, a resonant filter circuit for transmitting a current having a voltage proportional to the frequency departure of the alternator, a motor of the watt-hour meter type driven by the current transmitted by the filter circuit, an arm actuated by said motor, control switches for the alternator driving motor, means for normally holding the arm in a neutral position, means cooperating with said switch means accomplishing intermittent control impulses to the driving motor of the alternator, means for varying the duration of the current supply impulses, and means for integrating the frequency deviation with respect to time.

WILSON A. CHARBONNEAUX.